(12) United States Patent
Kim

(10) Patent No.: US 12,540,879 B2
(45) Date of Patent: Feb. 3, 2026

(54) DIAGNOSTIC SENSING STRUCTURE FOR DRONE'S DRIVE SYSTEM AND BLOCK-TYPE DIAGNOSTIC DEVICE FOR DRONE'S DRIVE SYSTEM INCLUDING SAME

(71) Applicant: WEFLO INC., Daejeon (KR)

(72) Inventor: Yee Jung Kim, Sejong (KR)

(73) Assignee: WEFLO INC., Daejeon (KR)

( * ) Notice: Subject to any disclaimer, the term of this patent is extended or adjusted under 35 U.S.C. 154(b) by 201 days.

(21) Appl. No.: 18/274,130

(22) PCT Filed: Dec. 5, 2022

(86) PCT No.: PCT/KR2022/019575
§ 371 (c)(1),
(2) Date: Jul. 25, 2023

(87) PCT Pub. No.: WO2024/071521
PCT Pub. Date: Apr. 4, 2024

(65) Prior Publication Data
US 2024/0418602 A1    Dec. 19, 2024

(30) Foreign Application Priority Data

Sep. 28, 2022  (KR) .................. 10-2022-0123546
Oct. 27, 2022  (KR) .................. 10-2022-0140289

(51) Int. Cl.
*G01M 13/00* (2019.01)
*B64F 5/60* (2017.01)
*G01R 31/34* (2020.01)

(52) U.S. Cl.
CPC ............... *G01M 13/00* (2013.01); *B64F 5/60* (2017.01); *G01R 31/343* (2013.01)

(58) Field of Classification Search
None
See application file for complete search history.

(56) References Cited

U.S. PATENT DOCUMENTS

2022/0234734 A1\*  7/2022  Lai .................... G08G 5/55

FOREIGN PATENT DOCUMENTS

| CN | 102460329 A | | 5/2012 | |
|---|---|---|---|---|
| JP | 2020-38166 A | | 3/2020 | |
| JP | 2021046111 A | \* | 3/2021 | |
| KR | 10-2017-0017517 A | | 2/2017 | |
| KR | 10-2022-0103265 A | | 7/2022 | |
| KR | 20220103265 A | \* | 7/2022 | ............. B64U 70/90 |

\* cited by examiner

*Primary Examiner* — Hitesh Patel
*Assistant Examiner* — Wenyuan Yang
(74) *Attorney, Agent, or Firm* — WHDA, LLP

(57) ABSTRACT

Proposed is a diagnostic sensing structure for a drone's drive system and a block-type diagnostic device for a drone's drive system including the same, which, by having a diagnostic sensor unit measuring physical quantities generated from the drone's drive system, may accurately diagnose any abnormalities in the drive system such as a motor and blade before flight, may detect abnormal operation of the drone's drive system during takeoff and landing by configuring, together with a general block-type dummy pad, a block-type sensor pad that detects abnormal operation of the drive system as a takeoff and landing site for drones, and may significantly reduce the costs of building a station and diagnostic system for drones.

8 Claims, 6 Drawing Sheets

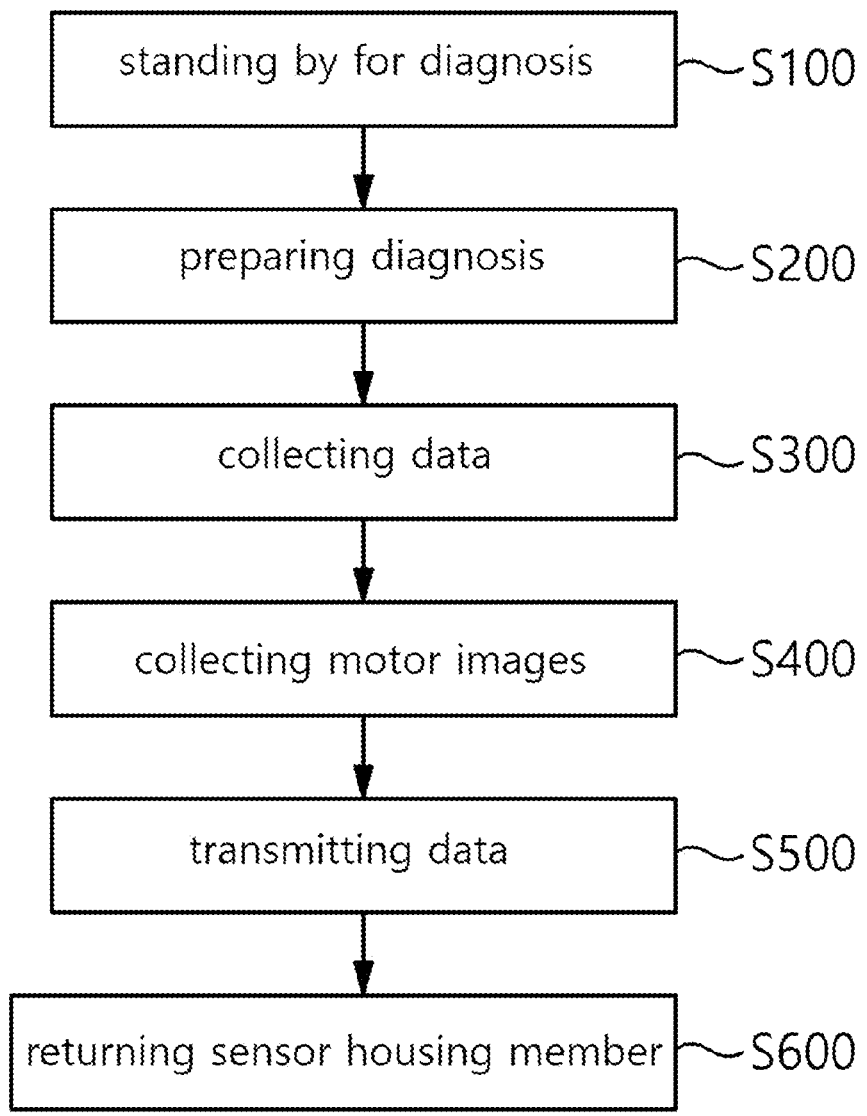

DIAGNOSTIC SENSING STRUCTURE FOR DRONE'S DRIVE SYSTEM AND BLOCK-TYPE DIAGNOSTIC DEVICE FOR DRONE'S DRIVE SYSTEM INCLUDING SAME

TECHNICAL FIELD

The present disclosure relates to a diagnostic sensing structure for a drone's drive system and a block-type diagnostic device for a drone's drive system including the same and, more particularly, to a diagnostic sensing structure for a drone's drive system and a block-type diagnostic device for a drone's drive system including the same, used to detect the presence or absence of abnormalities in a drive system of large drones before flight.

BACKGROUND ART

In general, most drone service providers use mat-type pads laid on the ground or drone takeoff and landing sites with takeoff and landing site markings to launch a drone and land the drone when it has returned after completing tasks.

Drones landed on takeoff and landing pads (sites) periodically have their drive systems, such as motors and blades, checked, and then take off again to start flight.

Normally, the drone's drive system is visually checked by a technician for abnormal conditions. Yet, since it is impossible to accurately determine the condition of the drone's motor and blades with a simple visual inspection of the drive system, during the actual flight of drones, numerous serious accidents due to malfunctions of the drive system frequently occur.

In order to solve these problems, Korean Patent No. 10-2261899 "APPARATUS AND METHOD FOR DIAGNOSING FAULT OF DRONE" discloses a structure in which drone abnormalities are diagnosed by collecting vibration raw data generated during drone operation by a vibration sensor unit.

However, in the case of the above cited invention, it is difficult to accurately diagnose an entire driving system of a drone because the cited invention simply uses a vibration sensor to determine whether or not the operation of the drone is abnormal.

In addition, since drones come in a variety of sizes, manufacturing a case-type (storable and with an openable door) station of a specific size is costly, and since a drone station is not easy to install or move and breaks down frequently, case-type stations are not very useful in the commercialization stage.

Moreover, due to lack of precise guided landing technology for drones, the case-type station does not automatically land and problems in terms of risk elimination are not resolved.

DISCLOSURE

Technical Problem

The present disclosure has been made keeping in mind the problems occurring in the related art. An objective of the present disclosure is to provide a diagnostic sensing structure for a drone's drive system and a block-type diagnostic device for a drone's drive system including the same, which accurately diagnose any abnormalities in a drone's drive system, such as motors and blades, before flight.

Another objective of the present disclosure is to provide a diagnostic sensing structure for a drone's drive system and a block-type diagnostic device for a drone's drive system including the same, which reduce drone station manufacturing costs and detect abnormal operation of the drone's drive system during takeoff and landing by making the diagnostic sensing structure for a drone's drive system into a block-type sensor pad and constructing this pad, together with a general block-type dummy pad, as a takeoff and landing site for drones.

Technical Solution

In order to achieve the above mentioned objective, according to an embodiment of the present disclosure, there is provided a diagnostic sensing structure for a drone's drive system, including: a sensing housing unit: a diagnostic sensor unit located in the sensing housing unit and capable of detecting abnormal operation of a drone's drive system; and a controller configured to transmit detection signals received from the diagnostic sensor unit to an external drone control system.

In the present disclosure, the diagnostic sensor unit may include at least two of: a magnetic field detection part configured to detect a change in a magnetic field generated by a drive motor of the drive system: a frequency shift detection part configured to measure a Doppler shift in frequency generated by a blade of the drive system; and a wave detection part configured to measure a soundwave generated by the blade of the drive system.

In the present disclosure, the diagnostic sensor unit may include: a magnetic field detection part configured to detect a change in a magnetic field generated by a drive motor of the drive system: a frequency shift detection part configured to measure a Doppler shift in frequency generated by a blade of the drive system: and a wave detection part configured to measure a soundwave generated by the blade of the drive system.

In the present disclosure, the frequency shift detection part and the wave detection part may be mounted to be exposed to the outside of the sensing housing unit.

The embodiment of the diagnostic sensing structure for a drone's drive system according to the present disclosure may further include: a thermal imaging camera unit located in the sensing housing unit for capturing images of a drive motor of the drive system and transferring the captured images to the controller.

In the present disclosure, the thermal imaging camera unit may measure thermal distribution of the drive motor and may be connected to the controller to determine a relative position between the drive motor and the diagnostic sensor unit.

In the present disclosure, the sensing housing unit may include: a control housing member in which the controller and the thermal imaging camera unit are located; a sensor housing member rotatably connected to the control housing member and having the diagnostic sensor unit located therein: and a housing rotation part capable of rotating and erecting the sensor housing member.

In the present disclosure, the diagnostic sensor unit may include a magnetic field detection part configured to detect a change in a magnetic field generated by a drive motor of the drive system, and a frequency shift detection part configured to measure a Doppler shift in frequency generated by a blade of the drive system, wherein the frequency shift detection part and a wave detection part may be mounted to be exposed to the outside at an end side of the sensor housing member, and may be positioned while being exposed toward the blade when the sensor housing member is erected.

The embodiment of the diagnostic sensing structure for a drone's drive system according to the present disclosure may further include: a distance detection unit configured to measure a distance between the drive system and the sensor housing member in a state where the sensor housing member is erected and transmit information on the distance to the controller.

In the present disclosure, the thermal imaging camera unit may be connected to the controller, and an align area may be displayed on an image screen of the thermal imaging camera unit, wherein the controller may measure a temperature of the drive motor within the align area when it is confirmed that the drive motor of the drive system is located within the align area, may actuate the housing rotation part to erect and position the sensor housing member, and may actuate the diagnostic sensor unit.

In order to achieve the above mentioned objective, according to an embodiment of the present disclosure, there is provided a block-type diagnostic device for a drone's drive system, the diagnostic device including: block-type sensor pad parts configured to detect whether or not drive systems of a drone operates abnormally: and block-type bottom pad parts disposed in contact with the block-type sensor pad parts, wherein the block-type sensor pad parts and the block-type bottom pad parts may constitute a takeoff and landing site where a drone may take off and land.

In the present disclosure, each of the block-type sensor pad parts may be the diagnostic sensing structure for a drone's drive system of claim 1.

In the present disclosure, the block-type sensor pad parts may have the same number as the drive systems and may be provided correspondingly at locations where the drone takes off and lands, and the block-type bottom pad parts may be provided in remaining parts of the takeoff and landing site except for locations where block-type sensor pad parts are provided.

Advantageous Effects

The present disclosure can prevent accidents caused by failure of a drone's drive system during actual flight of a drone and greatly improve the flight stability of the drone since any abnormalities in the drive system such as motors and blades can be accurately diagnosed by including a diagnostic sensor unit that measures the physical quantities generated in the drive system of the drone.

The present disclosure can reduce drone station manufacturing costs and easily detect abnormal operation of the drone's drive system during takeoff and landing by making the diagnostic sensing structure for a drone's drive system into a block-type sensor pad and constructing this pad, together with a general block-type dummy pad, as a takeoff and landing site for drones.

In addition, the present disclosure can significantly reduce the cost of building a diagnostic system for drones and greatly improve the diagnostic accuracy for the drive system by effectively arranging sensors in a block-type form to fit the size of a drone and relative location of a drive system thereof according to the size of the drone.

DESCRIPTION OF DRAWINGS

FIG. 6 is a flowchart illustrating an operation method of the block-type diagnostic device for a drone's drive system according to the present disclosure.

DESCRIPTION OF NUMERALS

Figure 1:
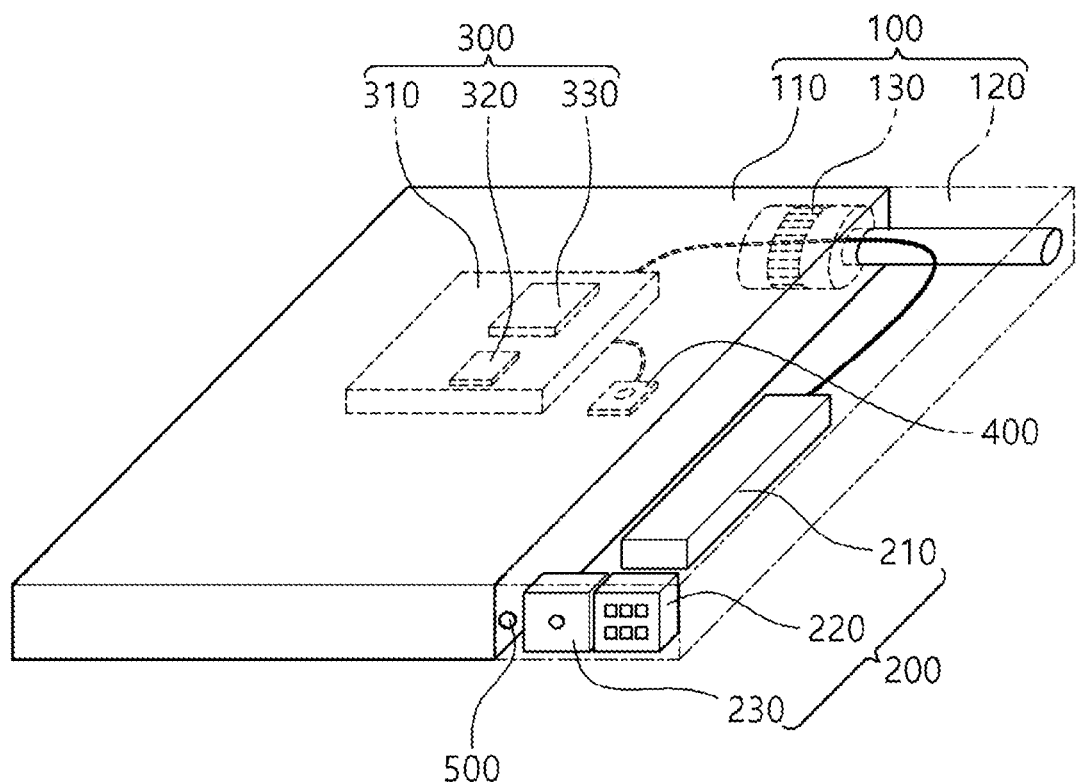
FIGS. 1 and 2 are schematic views illustrating a diagnostic sensing structure for a drone's drive system according to the present disclosure.

1: drone body 2: drive system
2a: drive motor 26: blade
10: block-type sensor pad part 20: block-type bottom pad part
100: sensing housing unit 110: control housing member
120: sensor housing member 130: housing rotation part
200: diagnostic sensor unit 210: magnetic field detection part
220: frequency shift detection part 230: wave detection part
300: controller 310: control computer
320: wireless communication part 330: data collection part
400: thermal imaging camera unit 400a: align area
500: distance detection unit
S100: standing by for diagnosis S200: preparing diagnosis
S300: collecting data S400: collecting motor images
S500: transmitting data S600: returning sensor housing

BEST MODE

Hereinafter, the present disclosure will be described in more detail.

Preferred embodiments of the present disclosure will be described in detail with reference to the accompanying drawings. Prior to the detailed description of the present disclosure, the terms or words used in this specification and claims described below should not be construed as being limited to common or dictionary meanings. The embodiments described in this specification and the configurations shown in the drawings are merely the most preferred embodiments of the present disclosure and do not represent all the technical ideas of the present disclosure. Therefore, it should be understood that there may be various equivalents and modifications that may be substituted for the embodiments and configurations at the time of this application.

Figure 2:
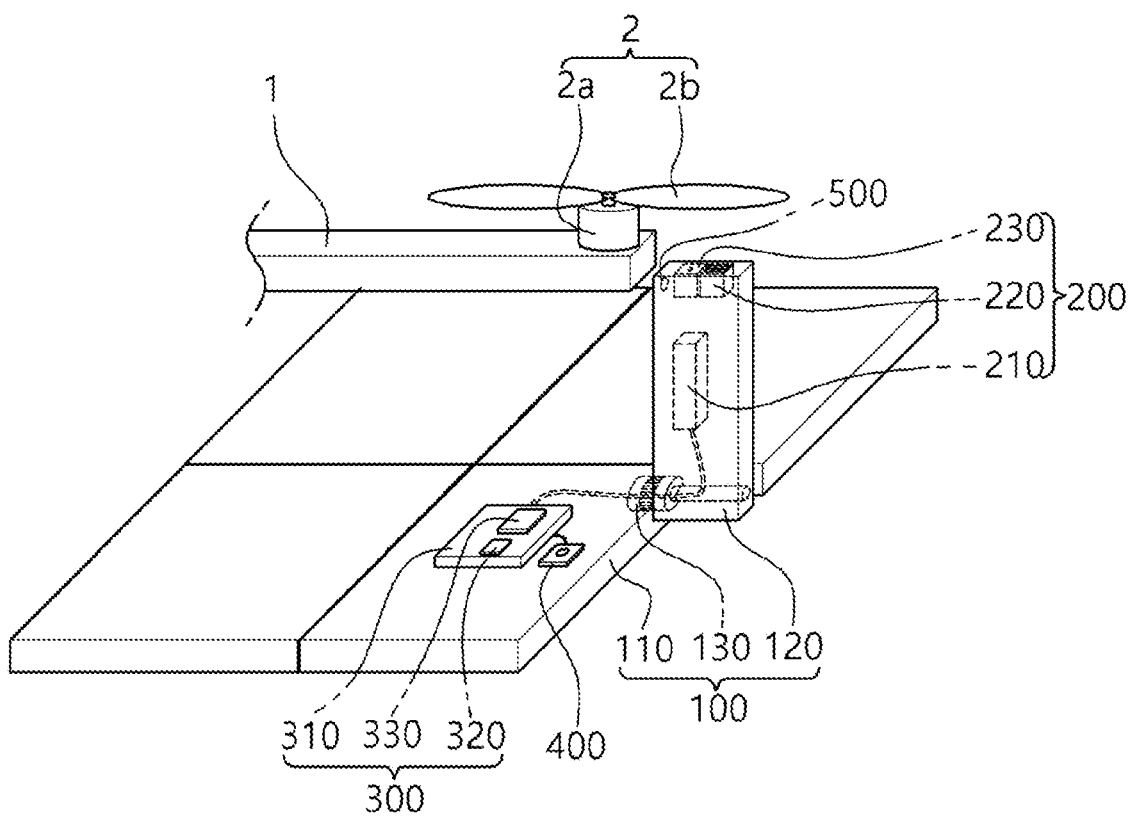
Figure 3:
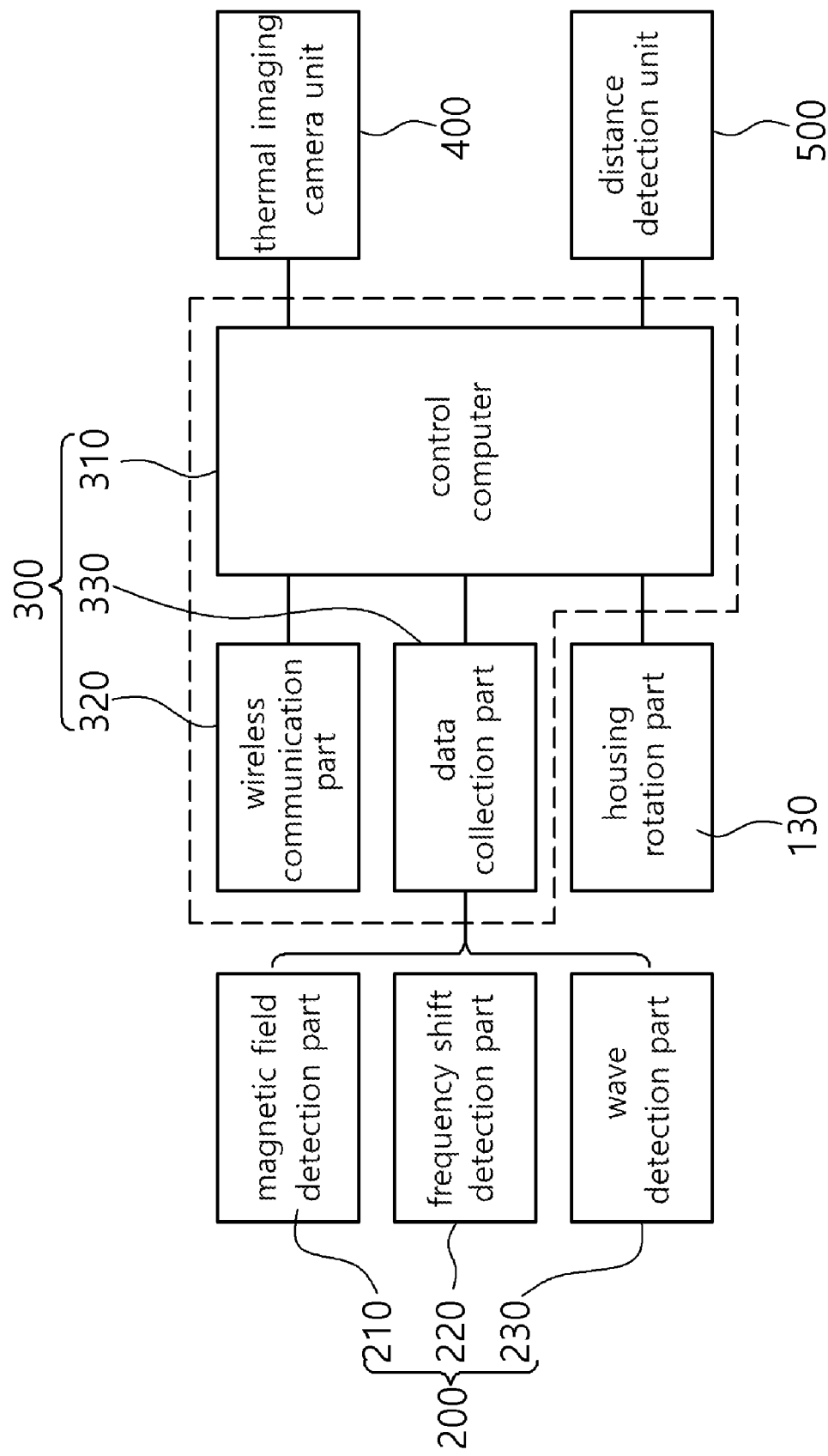
FIG. 3 is a block diagram illustrating the diagnostic sensing structure for a drone's drive system according to the present disclosure.

FIGS. 1 and 2 are schematic views illustrating a diagnostic sensing structure for a drone's drive system according to the present disclosure, FIG. 2 is a schematic view illustrating an operation example of the diagnostic sensing structure for a drone's drive system according to the present disclosure, and FIG. 3 is a block diagram illustrating the diagnostic sensing structure for a drone's drive system according to the present disclosure.

Referring to FIGS. 1 to 3, an embodiment of the diagnostic sensing structure for a drone's drive system according to the present disclosure will be described in detail below.

The embodiment of the diagnostic sensing structure for a drone's drive system according to the present disclosure is to detect abnormal operation of a drive motor 2a and a blade 2b, which are a drive system 2 of a drone, that is, to determine whether there is a failure or whether there is abnormal operation that is about to cause a failure.

The embodiment of the diagnostic sensing structure for a drone's drive system according to the present disclosure includes a sensing housing unit 100.

A diagnostic sensor unit 200 located in the sensing housing unit 100 is a sensor capable of detecting abnormal operation of the drive system 2 of the drone, and inside the sensing housing unit 100, the diagnostic sensor unit 200 for detecting different types of failure factors are located to more accurately detect whether or not the drive system 2 of the drone operates abnormally.

In the sensing housing unit 100, a controller 300 that transmits detection signals received from the diagnostic sensor unit 200 to an external drone control system (not shown) is located.

The diagnostic sensor unit 200 includes at least two of: a magnetic field detection part 210 for detecting a change in magnetic field; a frequency shift detection part 220 for measuring a Doppler frequency shift: and a wave detection part 230 for measuring a soundwave to detect whether or not the drone's drive system 2 is abnormally operated.

The diagnostic sensor unit 200 includes at least two of: the magnetic field detection part 210 for detecting a change in magnetic field: the frequency shift detection part 220 for measuring a Doppler frequency shift: and the wave detection part 230 for measuring a soundwave to detect whether or not the drone's drive system 2 is abnormally operated.

The diagnostic sensor unit 200 includes: the magnetic field detection part 210 for detecting a change in magnetic field: the frequency shift detection part 220 for measuring a Doppler frequency shift: and the wave detection part 230 for measuring a soundwave to detect whether or not the drone's drive system 2 is abnormally operated.

The magnetic field detection part 210 is for detecting a change in the magnetic field generated by the drive motor 2a, and is located as close as possible to the drive motor 2a to detect a change in the magnetic field generated by the drive motor 2a, and transmit the detected change in the magnetic field to the controller 300.

In addition, the frequency shift detection part 220 measures the Doppler frequency shift caused by the blade 2b, that is, the wing of the drone, and the wave detection part 230 detects the soundwave. The frequency shift detection part 220 and the wave detection part 230 are mounted so as to be exposed to the outside of the sensing housing unit 100.

As an example, the controller 300 includes a wireless communication part 320 to transmit the wave of a change in the magnetic field of the drive motor 2a detected by the magnetic field detection part 210, the Doppler frequency shift caused by the blade 2b detected by the frequency shift detection part 220, and the soundwave of the blade 2b detected by the wave detection part 230 to a drone control system (not shown).

As an example, the wireless communication part 320 uses a known wireless communication means such as a 4G E or 5G wireless communication network of a mobile communication company, Wi-Fi, or Bluetooth.

The controller 300 includes a control computer 310, the wireless communication part 320, and a data collection part 330, so that the controller 300 is connected to the drone control system (not shown) through wireless communication and exchanges commands and data with the drone control system (not shown).

The drone control system (not shown) diagnoses normal operation of the drive system 2 when the physical quantities measured by the diagnostic sensor unit 200 falls within the preset range, and diagnoses abnormal operation of the drive system 2 when the physical quantities measured by the diagnostic sensor unit 200 is out of the preset range.

The control computer 310 is connected to an external control PC of the drone control system (not shown) through the wireless communication part 320, and exchanges commands and data.

The magnetic field detection part 210, the frequency shift detection part 220, and the wave detection part 230 are individually connected to the data collection part 330 and receive a command from the control computer 310 to perform analog data sampling.

As an example, the sensing housing unit 100 may have a thin pad shape and be formed in a rectangular parallelepiped block type. In addition, the sensing housing unit 100 may be a block-type pad shape having a regular hexagonal or regular octagonal shape on a plane, and may be variously modified and implemented in a known block shape in which blocks may be bonded to form a flat bottom.

As an example, the sensing housing unit 100 may have a block-type pad body. The sensing housing unit 100 may have a block-type pad body and, along with other general block-type support pad parts, may easily configure a block-type diagnostic device for a drone's drive system on which a drone can take off and land and capable of diagnosing abnormal operation of the drone's drive system 2.

An embodiment of a block-type diagnostic device for a drone's drive system according to the present disclosure will be described in detail below.

Meanwhile, the embodiment of the diagnostic sensing structure for a drone's drive system according to the present disclosure may further include a thermal imaging camera unit 400 located in the sensing housing unit 100 for capturing images of the drive motor 2a of the drive system 2 and transferring the captured images to the controller 300.

The thermal imaging camera unit 400 measures thermal distribution of the drive motor 2a to determine whether the drive motor 2a is abnormally operating, and is connected to the controller 300, that is, the control computer 310 to determine the relative position between the drive motor 2a and the sensor, that is, the drive motor 2a and the diagnostic sensor unit 200.

In addition, the sensing housing unit 100 includes: a control housing member 110 in which the controller 300 and the thermal imaging camera unit 400 are located: a sensor housing member 120 rotatably connected to the control housing member 110 and having diagnostic sensor unit 200 located therein: and a housing rotation part 130 capable of rotating and erecting the sensor housing member 120.

As an example, the control housing member 110 and the sensor housing member 120 have block-type pad bodies, and the width of the sensor housing member 120 is formed smaller than the width of the control housing member 110.

The sensor housing member 120 is rotatably connected to the control housing member 110 by a hinge shaft, and the housing rotation part 130 may include a housing rotation motor connected to the hinge shaft to erect the sensor housing member 120 in a vertical direction.

The frequency shift detection part 220 and the wave detection part 230 are mounted to be exposed to the outside at the end side of the sensor housing member 120, and are positioned while being exposed toward the blade 2b of the drone when the sensor housing member 120 is erected.

When the sensor housing member 120 is erected, the sensor housing member 120 is positioned toward the top, that is, exposed toward the blade 2b of the drone that has taken off, so that the frequency shift detection part 220 and the wave detection part 230 may each accurately measure the Doppler shift in frequency and the sound wave generated from the blade 2b, that is, the blade 2b for the wing of the drone.

The magnetic field detection part 210 is located in the middle of the sensor housing member 120, and is installed as close to the drive motor 2a as possible, that is, installed close to the drive motor 2a of the drone within a range that does not interfere with the frequency shift detection part 220 and the wave detection part 230 on the upper part of the sensor housing member 120.

In addition, the embodiment of the diagnostic sensing structure for a drone's drive system according to the present disclosure may further include a distance detection unit 500 that measures the distance between the drone and the sensor housing member 120 in a state where the sensor housing member 120 is erected and transmits the distance information to the controller 300.

The distance detection unit 500 is mounted to be exposed at the end side of the sensor housing member 120, and is positioned toward the blade 2b of the drone in a state where the sensor housing member 120 is erected to detect the distance between the drive system 2 of the drone, that is, the blade 2b and the end of the sensor housing member 120.

In addition, the distance detection unit 500 may be located below the drive system 2 of the drone, that is, below the drive motor 2a to measure the distance between the drone and the sensor housing member 120 and transmit the distance information to the controller 300.

The distance detection unit 500 detects the distance between the end side of the sensor housing member 120 and the drone, and transmits the detected distance information to the controller 300.

By transmitting the detected distance information detected by the distance detection unit 500 to the drone control system (not shown) that controls the operation of the drone, the controller 300 may adjust the position of the drone, maintain an appropriate distance between the drive system 2 of the drone and the frequency shift detection part 220 and the wave detection part 230, and prevent an accident in which the drive system 2 of the drone collides with the end of the sensor housing member 120 that is erected.

Figure 4:
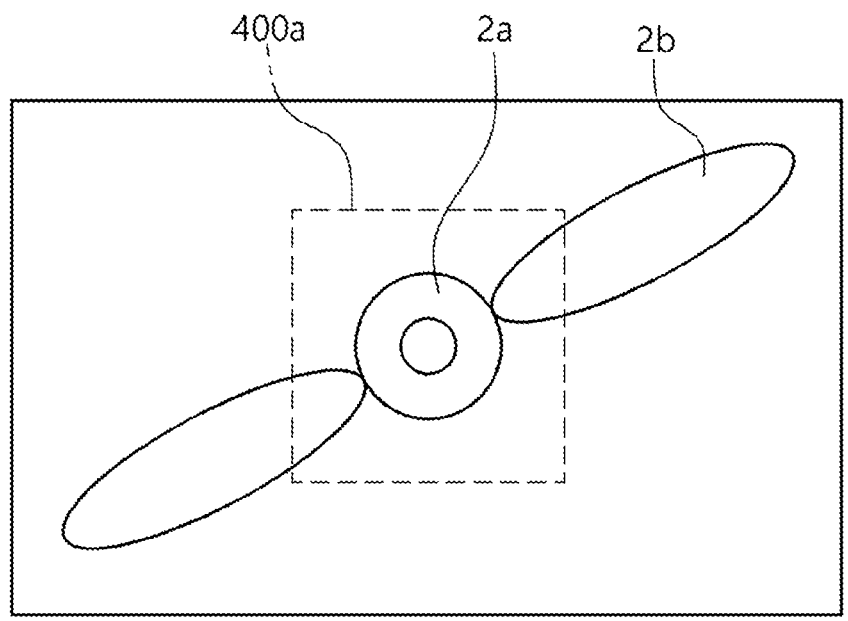
FIG. 4 is a schematic view illustrating an example of an image screen of a thermal imaging camera unit in the diagnostic sensing structure for a drone's drive system according to the present disclosure.

FIG. 4 is a schematic view illustrating an example of an image screen of the thermal imaging camera unit 400 in the diagnostic sensing structure for a drone's drive system according to the present disclosure. Referring to FIG. 4, the thermal imaging camera unit 400 is connected to the control computer 310, and an align area 400a is displayed on the image screen of the thermal imaging camera unit 400.

When it is confirmed that the motor of the drone is located within the align area 400a on the image screen of the thermal imaging camera unit 400, the control computer 310 measures the temperature of the drive motor 2a in the align area 400a, and actuates the housing rotation part 130 to erect the sensor housing member 120 in order to diagnose whether or not the drive system 2 of the drone operates abnormally.

Figure 5:
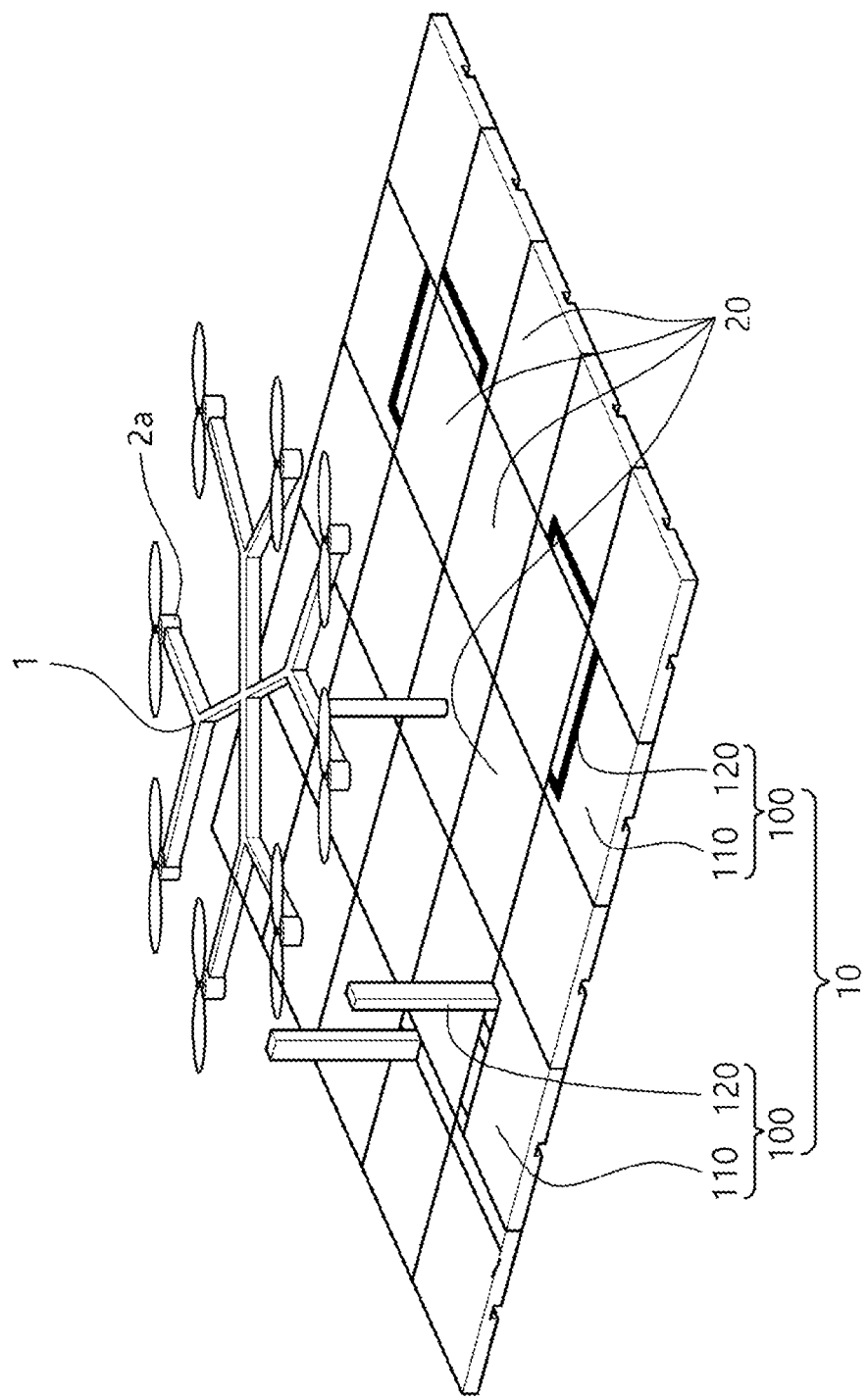
FIG. 5 is a perspective view illustrating a block-type diagnostic device for a drone's drive system according to the present disclosure.

FIG. 5 is a perspective view illustrating a block-type diagnostic device for a drone's drive system according to the present disclosure. Referring to FIG. 5, an embodiment of the block-type diagnostic device for a drone's drive system according to the present disclosure includes: a plurality of block-type sensor pad parts 10 that detect whether or not the drive system 2 of the drone operates abnormally: and a plurality of block-type bottom pad parts 20 disposed in contact with the block-type sensor pad parts 10, and constitutes a takeoff and landing pad for drones where a drone can take off and land.

In addition, as an example, the plurality of block-type sensor pad parts 10 include the embodiment of the diagnostic sensing structure for a drone's drive system according to the present disclosure.

The plurality of block-type sensor pad parts 10 are positioned to face the drive system 2 of the drone at the location where the drone takes off and lands, and may detect abnormal operation of the drone's drive system 2.

The plurality of block-type bottom pad parts 20 are general block-type pads made of a known flooring material capable of forming a floor, are used as a flooring material constituting the takeoff and landing site of a drone without any other function, and may be variously modified and implemented as a known flooring material capable of constituting a takeoff and landing site of a drone.

In addition, the block-type sensor pad part 10 and the block-type bottom pad part 20 are manufactured in the same shape and, by adhering to each other, have a block assembly structure that can form a flat floor.

As an example, the block-type sensor pad part 10 and the block-type bottom pad part 20 are formed in a block type, which is a rectangular parallelepiped. In addition, the block-type sensor pad part 10 and the block-type bottom pad part 20 may be a block-type pad shape having a regular hexagonal or regular octagonal shape on a plane, and may be variously modified and implemented in a known block shape in which blocks may be bonded to form a flat bottom.

The drone includes a drone body 1 and a plurality of drive systems 2 and is capable of vertical takeoff and landing. The block-type sensor pad parts 10 are located facing the drive systems 2 at a location where the drone takes off and lands among the floors constituting the takeoff and landing site of the drone. Of the floor constituting the take-off and landing site of the drone, the remaining parts except for the locations where the block-type sensor pad parts 10 are provided are composed of block-type bottom pad parts 20.

The drive system 2 includes: a blade 2b that rotates to generate lift for vertical takeoff and landing of the drone body 1: and a drive motor 2a for rotating the blade 2b. Since the drive system 2 may be variously modified and implemented using a known drive structure in drones, so a detailed description thereof will be omitted.

As described above, the block-type sensor pad parts 10 are provided in the same number as the drive systems 2 and are located correspondingly at a location where the drone takes off and lands of the floor constituting the takeoff and landing site of the drone. The block-type bottom pad parts 20 are located in the remaining parts except for the locations where the block-type sensor pad parts 10 are provided of the floor constituting the takeoff and landing site of the drone, and together with the block-type sensor pad parts 10, may form a flat drone takeoff and landing site.

FIG. 6 is a flowchart illustrating an operation method of the block-type diagnostic device for a drone's drive system according to the present disclosure. Referring to FIGS. 1 to 6, the operation method of the block-type diagnostic device for a drone's drive system according to the present disclosure will be described in detail below.

The drone takeoff and landing site includes the block-type sensor pad parts 10 positioned to correspond to the drive systems 2 of the drone at a takeoff and landing location of the drone; and the block-type bottom pad parts 20 located in areas other than the block-type sense pad parts are located.

In addition, as an example, the block-type sensor pad parts 10 include the embodiment of the diagnostic sensing structure for a drone's drive system according to the present disclosure.

The operation method of the block-type diagnostic device for a drone's drive system according to the present disclosure is to diagnose whether or not the drive system 2 of the drone operates abnormally by operating the diagnostic sensing structure for a drone's drive system according to the present disclosure.

The diagnosis method for the drive system 2 of the drone using the diagnostic sensing structure for a drone's drive system according to the present disclosure includes: standing by for diagnosis S100 for preparing 300 to receive an external command through the wireless communication part 320 and operating the thermal imaging camera unit 400 when power is applied to the controller; preparing diagnosis S200 for erecting the sensor housing member 120 vertically by rotating the sensor housing member 120 with the housing rotation part 130 when the drive motor 2a of the drive system 2 of the drone to land falls within the align area 400a on the image screen captured by the thermal imaging camera unit 400; collecting data S300 for measuring the physical quantities of the drive system 2 with the diagnostic sensor unit 200 and transmitting the measured physical quantities to the data collection part 330 of the controller 300 after the sensor housing member 120 is erected vertically: collecting motor images S400 for capturing thermal distribution of the drive motor 2a with the thermal imaging camera unit 400 and transmitting the captured thermal distribution to the data collection part 330 similar to the step of collecting data S300; transmitting data S500 for transmitting, after the steps of collecting data S300 and collecting motor images S400, collected data to the drone control system (not shown) through wireless communication: and returning a sensor housing member S600 for returning, after the step of transmitting data S500, the sensor housing member 120 to its original position to form a flat floor by reversely rotating the sensor housing member 120 with the housing rotation part 130.

In the step of collecting data S300, the magnetic field detection part 210 detects the magnetic field of the drive motor 2a in the drive system 2 of the drone, the frequency shift detection part 220 measures the Doppler frequency generated from the blade 2b, that is, the wing, in the drive system 2 of the drone, and the wave detection part 230 measures the soundwave generated from the blade 2b, that is, the wing, in the drive system 2 of the drone.

The sensor housing member 120 is erected by means of the housing rotation part 130 when a drone lands or takes off to be located as close as close as possible to the drone's drive system 2 in operation in order to accurately measure the physical quantities generated by the drive system 2, that is, the physical quantities with which abnormal operation of the drive system 2 may be diagnosed.

After the physical quantities with which abnormal operation of the drive system 2 may be diagnosed is measured by sensor units, the sensor housing member 120 returns to its original position through the step of returning a sensor housing member S600 to form a flat floor where drones can take off and land together with the control housing member 110.

The drone control system (not shown) may diagnose whether or not the drone's drive system 2 operates abnormally on the basis of the physical quantities, that is, the magnetic field of the drive motor 2a, the Doppler frequency of the blade 2b, and the soundwave, measured in the drone's drive system 2 received in the step of transmitting data.

The drone control system (not shown) may diagnose normal operation of the drive system 2 when each of the magnetic field of the drive motor 2a, the Doppler frequency of the blade 2b, and the soundwave measured by the diagnostic sensor unit 200 falls within the preset range.

In addition, the drone control system (not shown) may diagnose abnormal operation of the drive system 2 when each of the magnetic field of the drive motor 2a, the Doppler frequency of the blade 2b, and the soundwave measured by the diagnostic sensor unit 200 is out of the preset range.

In addition, the drone control system communicates with an application for diagnosing the drive system of a drone installed in a portable terminal of a user through wireless communication and delivers the diagnosis result of the drive system 2 of the drone 10 detected by the diagnostic sensor unit 200 to the application for diagnosing the drive system.

The drone control system receives the physical quantities of the drive system 2 of the drone 10 detected by the diagnostic sensor unit 200, and transmits the diagnosis result of confirming whether the drive system 2 operates abnormally through data analysis to the application for diagnosing the drive system.

The user can easily check the diagnosis result of the drive system 2 of the drone detected by the diagnostic sensor unit 200 by executing the application for diagnosing the drive system of the drone 10 on a portable terminal.

The portable terminal is a smartphone as an example, and may include other known portable terminals such as a tablet PC.

The present disclosure may prevent accidents caused by failure of a drone's drive system 2 during actual flight of a drone and greatly improve the flight stability of the drone since any abnormalities in the drive system 2 such as a motor 2a and blade 2b may be accurately diagnosed.

The present disclosure may reduce drone station manufacturing costs and easily detect abnormal operation of the drone's drive system 2 during takeoff and landing by making the diagnostic sensing structure for a drone's drive system into a block-type sensor pad and constructing this pad, together with a general block-type dummy pad, as a takeoff and landing site for drones.

In addition, the present disclosure may significantly reduce the cost of building a diagnostic system for drones and greatly improve the diagnostic accuracy for the drive system 2 by effectively arranging sensors in a block-type form to fit the size of a drone and relative location of a drive part thereof according to the size of the drone.

It should be noted that the present disclosure is not limited to the above embodiments, and may be implemented with various changes without departing from the gist of the present disclosure, which is included in the configuration of the present disclosure.

The invention claimed is:

1. A diagnostic sensing structure for a drone's drive system, the sensing structure comprising:
   a sensing housing unit that has a pad shape and constitutes a takeoff and landing site where the drone can take off and land;
   a diagnostic sensor unit located in the sensing housing unit and capable of detecting abnormal operation of a drone's drive system;
   a controller configured to transmit detection signals received from the diagnostic sensor unit to an external drone control system; and a thermal imaging camera unit located in the sensing housing unit for capturing images of a drive motor of the drive system and transferring the captured images to the controller, wherein the thermal imaging camera unit measures thermal distribution of the drive motor and is connected to the controller to determine a relative position between the drive motor and the diagnostic sensor unit, and wherein the controller adjusts a position of the drone and maintains an appropriate distance between the drone's drive system and the diagnostic sensor unit to prevent an accident in which the drone's drive system collides with an end of the sensor housing unit.

2. The sensing structure of claim 1, wherein the diagnostic sensor unit comprises at least two of:
- the diagnostic sensor unit configured to detect a change in a magnetic field generated by a drive motor of the drive system;
- the diagnostic sensor unit configured to measure a Doppler shift in frequency generated by a blade of the drive system; and
- the diagnostic sensor unit configured to measure a soundwave generated by the blade of the drive system.

3. The sensing structure of claim 1, wherein the diagnostic sensor unit comprises:
- the diagnostic sensor unit configured to detect a change in a magnetic field generated by a drive motor of the drive system;
- the diagnostic sensor unit configured to measure a Doppler shift in frequency generated by a blade of the drive system; and
- the diagnostic sensor unit configured to measure a soundwave generated by the blade of the drive system.

4. The sensing structure of claim 3, wherein the diagnostic sensor units are mounted to be exposed to the outside of the sensing housing unit.

5. A diagnostic sensing structure for a drone's drive system, the sensing structure comprising:
- a sensing housing unit that has a pad shape and constitutes a takeoff and landing site where the drone can take off and land;
- a diagnostic sensor unit located in the sensing housing unit and capable of detecting abnormal operation of a drone's drive system;
- a controller configured to transmit detection signals received from the diagnostic sensor unit to an external drone control system; and
- a thermal imaging camera unit located in the sensing housing unit for capturing images of a drive motor of the drive system and transferring the captured images to the controller, wherein the sensing housing unit comprises:
- the sensing housing unit in which the controller and the thermal imaging camera unit are located;
- the sensing housing unit rotatably connected to the sensing housing unit and having the diagnostic sensor unit located therein; and
- the sensing housing unit capable of rotating and erecting the the sensing housing unit, and wherein the controller adjusts a position of the drone and maintains an appropriate distance between the drone's drive system and the diagnostic sensor unit to prevent an accident in which the drone's drive system collides with an end of the sensor housing unit.

6. The sensing structure of claim 5, wherein the diagnostic sensor unit comprises:
- the diagnostic sensor unit configured to detect a change in a magnetic field generated by a drive motor of the drive system; and
- the diagnostic sensor unit configured to measure a Doppler shift in frequency generated by a blade of the drive system, wherein the diagnostic sensor units are mounted to be exposed to the outside at an end side of the sensing housing unit, and are positioned while being exposed toward the blade when the sensing housing unit is erected.

7. The sensing structure of claim 5, further comprising:
a sensor configured to measure a distance between the drive system and the sensing housing unit in a state where the sensing housing unit is erected and transmit information on the distance to the controller.

8. The sensing structure of claim 5, wherein the thermal imaging camera unit is connected to the controller, and an align area is displayed on an image screen of the thermal imaging camera unit, wherein the controller measures a temperature of the drive motor within the align area when it is confirmed that the drive motor of the drive system is located within the align area, actuates the sensing housing unit to erect and position the sensing housing unit, and actuates the diagnostic sensor unit.

* * * * *